US011498410B2

(12) United States Patent
Bindl et al.

(10) Patent No.: US 11,498,410 B2
(45) Date of Patent: Nov. 15, 2022

(54) POWERED AXLE FOR DUAL WHEEL WORK VEHICLE

(71) Applicant: Deere & Company, Moline, IL (US)

(72) Inventors: Reginald M. Bindl, Bettendorf, IA (US); Kevin M. Allen, Bartlesville, OK (US)

(73) Assignee: DEERE & COMPANY, Moline, IL (US)

( * ) Notice: Subject to any disclaimer, the term of this patent is extended or adjusted under 35 U.S.C. 154(b) by 512 days.

(21) Appl. No.: 16/661,432

(22) Filed: Oct. 23, 2019

(65) Prior Publication Data
US 2021/0122227 A1    Apr. 29, 2021

(51) Int. Cl.
*F16D 55/36*     (2006.01)
*B60K 7/00*     (2006.01)
(Continued)

(52) U.S. Cl.
CPC ........ *B60K 7/0007* (2013.01); *B60B 27/0052* (2013.01); *B60B 27/02* (2013.01);
(Continued)

(58) Field of Classification Search
CPC .......... B60K 7/0007; B60K 2007/0061; B60K 2007/003; B60K 17/046; B60B 27/0052; B60B 27/02; B60B 35/16; B60B 11/00; B60T 1/065; B60T 13/12; B60T 13/22; B60T 13/588; F16D 55/40; F16D 65/186; F16D 2121/04; F16D 2121/06; F16D 2121/14; F16D 2123/00; F16D 2055/0058
See application file for complete search history.

(56) References Cited

U.S. PATENT DOCUMENTS 3,770,074 A    11/1973   Sherman
3,946,837 A *   3/1976   Houser ............... F16D 55/40
                                                   92/108

(Continued)

FOREIGN PATENT DOCUMENTS

DE        3832649 A1 *   7/1989  ............. F16D 55/40
DE       19709576 A1     9/1998
EP        1595762 A1 * 11/2005  ............. F16D 55/36

OTHER PUBLICATIONS

Machine translation of EP-1595762 (no date).*
Machine translation of DE-3832649 (no date).*
General Electric, Allen Randolph, OHV Drive Systems Technology Update, WMEA Conference, Jun. 8, 2006.
(Continued)

*Primary Examiner* — Nicholas J Lane
(74) *Attorney, Agent, or Firm* — Klintworth & Rozenblat IP LLP (57) ABSTRACT

A powered axle for a work vehicle with a dual wheel arrangement includes an axle housing, an axle hub mounted to the axle housing, and an output hub having opposite axial ends supported by one or more wheel bearings for rotation about the axle hub along a rotation axis. An electric drive is disposed, at least in part, within the axle housing, and a hub gear set is disposed, at least in part, within the axle hub and configured to transmit power from the electric drive to the output hub for rotation of the dual wheel arrangement. A wheel brake disposed radially between the axle hub and the output hub and axially between the ends of the output hub is configured to selectively permit and arrest rotation of the output hub.

16 Claims, 7 Drawing Sheets

(51) Int. Cl.

| | | |
|---|---|---|
| *B60B 27/02* | (2006.01) | |
| *B60K 17/04* | (2006.01) | |
| *B60B 27/00* | (2006.01) | |
| *B60T 1/06* | (2006.01) | |
| *B60T 13/22* | (2006.01) | |
| *B60T 13/12* | (2006.01) | |
| *B60T 13/58* | (2006.01) | |
| *F16D 55/38* | (2006.01) | |
| *F16D 55/40* | (2006.01) | |
| *F16D 65/18* | (2006.01) | |
| *B60B 35/16* | (2006.01) | |
| *F16D 123/00* | (2012.01) | |
| *F16D 121/04* | (2012.01) | |
| *F16D 121/06* | (2012.01) | |
| *F16D 121/14* | (2012.01) | |

(52) U.S. Cl.
CPC ............ *B60B 35/16* (2013.01); *B60K 17/046* (2013.01); *B60T 1/065* (2013.01); *B60T 13/12* (2013.01); *B60T 13/22* (2013.01); *B60T 13/588* (2013.01); *F16D 55/38* (2013.01); *F16D 55/40* (2013.01); *F16D 65/186* (2013.01); *B60K 2007/0061* (2013.01); *F16D 2121/04* (2013.01); *F16D 2121/06* (2013.01); *F16D 2121/14* (2013.01); *F16D 2123/00* (2013.01)

(56) References Cited

U.S. PATENT DOCUMENTS

| | | | |
|---|---|---|---|
| 4,799,564 A | | 1/1989 | Iijima et al. |
| 8,833,497 B2 | * | 9/2014 | Shibukawa .......... F16D 65/0031 |
| | | | 475/159 |
| 2003/0010564 A1 | * | 1/2003 | Hinton ................. B60K 17/046 |
| | | | 188/72.4 |
| 2010/0191417 A1 | * | 7/2010 | Murahashi .............. B60B 11/06 |
| | | | 184/26 |
| 2012/0142475 A1 | * | 6/2012 | Shibukawa .......... B60K 7/0007 |
| | | | 475/159 |
| 2012/0205966 A1 | | 8/2012 | Witcher et al. |
| 2013/0065724 A1 | * | 3/2013 | Shinohara ............ B60K 17/046 |
| | | | 475/159 |
| 2014/0125112 A1 | * | 5/2014 | Bittlingmaier .......... B60B 11/02 |
| | | | 301/6.8 |
| 2015/0084397 A1 | * | 3/2015 | Kudo ....................... B60B 35/16 |
| | | | 903/952 |
| 2015/0233467 A1 | * | 8/2015 | Noerenberg ............ F16H 57/10 |
| | | | 192/221.1 |
| 2017/0190214 A1 | * | 7/2017 | Grimminger ....... F16H 37/0813 |
| 2019/0293158 A1 | | 9/2019 | Brown |
| 2020/0016973 A1 | * | 1/2020 | Hagihara .............. F16H 57/042 |
| 2021/0252967 A1 | * | 8/2021 | Iwabuchi ................ B60B 35/14 |

OTHER PUBLICATIONS

German Search Report issued in application No. DE102020211013.1 dated Jul. 9, 2021 (08 pages).

* cited by examiner

POWERED AXLE FOR DUAL WHEEL WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to powered axles for dual wheel work vehicles including, among other features, an efficient braking arrangement.

BACKGROUND OF THE DISCLOSURE

Work vehicles, such as used in the construction, agriculture, forestry, mining and other industries, are made for operation in off-road environments to carry or haul heavy loads. Such work vehicles usually have a heavy-duty build with a heavy-duty power source (e.g., an internal combustion engine) providing power to various work implements and propelling the work vehicle on ground-engaging wheels or tracks of various configurations (e.g., a single or dual axle with single or dual wheel arrangements). Various applications may require the vehicle to deliver high-torque, low-speed power to the ground-engaging wheels or tracks, or to various implements, in loaded operational conditions. At other times, relatively high-speed, low-torque operation may be required of these work vehicles, such as when unloaded and/or in transit. To facilitate both the high-torque demands at times and the high-speed demands at other times, the work vehicles may have heavy-duty axle assemblies that incorporate or cooperate with various gear assemblies to provide a high-ratio gear reduction to the wheels or tracks. The axle assemblies may transmit power to the wheels or tracks solely from the prime mover, or they may be powered themselves. Powered axle assemblies have one or more embedded electric or hydraulic drives that are powered by the primary power source to directly drive the wheels or tracks that propel the work vehicle.

SUMMARY OF THE DISCLOSURE

The disclosure provides a powered axle for a work vehicle having dual wheel arrangements.

In one aspect, the disclosure provides a powered axle for a work vehicle with a dual wheel arrangement. The powered axle includes an axle housing, an axle hub mounted to the axle housing, an output hub having opposite axial ends, and one or more wheel bearings supporting the output hub for rotation about the axle hub along a rotation axis. An electric drive is disposed, at least in part, within the axle housing, and a hub gear set is disposed, at least in part, within the axle hub and configured to transmit power from the electric drive to the output hub for rotation of the dual wheel arrangement. A wheel brake disposed radially between the axle hub and the output hub and axially between the ends of the output hub is configured to selectively permit and arrest rotation of the output hub.

In another aspect, the disclosure provides a work vehicle including a first wheel having a first wheel hub, a second wheel having a second wheel hub aligned along a common wheel axis with the first wheel, and a powered axle. The powered axle includes an axle housing, an axle hub mounted to the axle housing, an output hub, and one or more wheel bearings supporting the output hub for rotation about the axle hub along a rotation axis. The powered axle also includes an electric drive disposed, at least in part, within the axle housing, and a hub gear set disposed, at least in part, within the axle hub and configured to transmit power from the electric drive to the output hub for rotation of the first wheel hub and the second wheel hub. The powered axle also includes a wheel brake disposed radially between the axle hub and the output hub and axially, at least in part, between the first wheel hub and the second wheel hub, the wheel brake configured to selectively permit and arrest rotation of the output hub.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed powered axle, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "downstream," "upstream," "longitudinal," "radial," "axial," "circumferential," "lateral", and "transverse" may be used. Such terms are defined, at least in part, with respect to a dual wheel arrangement, a powered axle, transmission components, gear set components, wheel hubs, and/or a hydraulic system. As used herein, the term "longitudinal" indicates an orientation along the length of the apparatus; the term "lateral" indicates an orientation along a width of the apparatus and orthogonal to the longitudinal orientation; and the term "transverse" indicates an orientation along the height of the apparatus and orthogonal to the longitudinal and lateral orientations. These orientations may be taken in relation to a work vehicle, or a travel direction of the work vehicle, to which the components may be attached.

Overview

Heavy-duty work vehicles, especially high load capacity dump trucks (e.g., 100+ ton capacity mining trucks), require extremely robust constructions, particularly in the chassis, drive train (potentially including a transmission, axles, wheels or tracks, etc.) and power train (potentially including an internal combustion engine (e.g., diesel engine), electric motors, and the like). Under extreme loads, the work vehicles may operate at very low speeds (commonly referred to as "creeper" mode), which require very high torque to the wheels. When unloaded or under less load, or during transit (e.g., to/from a worksite), the work vehicles may operate at relatively high speeds (e.g., 40+ miles per hour (MPH)). To achieve the required torque demanded of these machines in certain applications, the drive train may include gearing to provide a deep gear ratio or reduction between the power train and the wheels. To accommodate a wide speed or torque range (that is, both high torque at certain times and high speeds at other times), the gearing may include a transmission configured to change the gear ratio in a manner modifying the rotational speed of the wheels and the torque output provided thereto. The gearing may be a self-contained transmission component in certain instances, but more likely is distributed at least in part within the drive train to provide a gear reduction, and possibly a selectable power transmission, at or near the wheels. Such gearing may be incorporated into the axle assemblies. In some cases, the power train may also be distributed to provide power at or near the wheels. Powered axle assemblies may have both drive gearing and drive power to provide the necessary speed and torque to the wheels. Certain conventional powered axles for heavy-duty work vehicles may utilize costly, heavy-duty induction motors and associated gearing to drive the wheels associated with the axle.

Braking components of the work vehicle may also be incorporated into the axle assemblies, whether powered or unpowered. Even in large vehicle platforms, size and weight may be constraints and manufacturing variabilities are considerations. As noted, axle assemblies, especially powered axles, have numerous components (e.g., various gearing, motor, and brake components) packaged within a finite space within the axle that is limited to the length between the wheels and, at the wheels, to the inner diameter of the wheel hubs. This can complicate assembly and impose design trade-offs for certain components. For example, the power demands may require the motor and gearing to occupy a large volume within the axle housing such that the brake arrangement may need to be located physically remote from the wheel hubs. An intermediate assembly may couple such remote brakes to the wheels, or the brakes may need to overlap axially with the wheel hubs. As a result, the radial dimension of the brake elements may be limited to the radial space between the wheel hubs and other features internal to the axle, which may adversely impact braking performance and limit access for service/maintenance.

This disclosure provides a powered axle for use in heavy-duty work vehicles that addresses these and other aspects of conventional arrangements. The powered axle is capable of achieving the requisite torque and speed characteristics to drive the wheels of high load capacity, for example as capable of carrying 40-100+ tons of material, at a very low-speed (or creeper) mode (e.g., 1-2 MPH) as well as at on-road transit speeds (e.g., 40+ MPH). Additionally, the disclosure further provides a powered axle particularly advantageous for dual wheel applications. It should be understood that as used herein the term "dual wheel" refers to two consecutive coaxially-aligned wheels at a single lateral (left/right) side of the axle. In certain embodiments, the powered axle has an elongated axle hub in the form of a trumpet housing having a flared or tapered inboard end and a narrow diameter, cylindrical section at an outboard end. The axle hub is dimensioned such that the elongated configuration of the trumpet housing places the small end at or near the axial midpoint between a pair of wheels, thus establishing a small diameter, central location for driveline components to couple to both wheels.

In another aspect, the disclosed powered axle may have improved braking capabilities. Certain embodiments may provide increased braking power over conventional designs by allowing for the use of larger brake elements (e.g., friction disks and plates), thereby affording more surface area for brake force to be applied. In certain embodiments, the brake arrangement is physically located in an interior space within the axle. This allows the brake to act on a rotating output hub that is directly (i.e., without an intermediate coupling assembly) coupled to the wheel hub(s), thereby providing a direct brake power flow path to the wheel(s). The powered axle also may be configured with a reduced diameter region of the axle hub in certain embodiments, thereby increasing the radial span available for the brake elements. Moreover, in certain embodiments, the braking system may readily accommodate different sizes or quantities of brake elements.

In another aspect, the braking system of the disclosed powered axle may have a single brake assembly that functions as both a service brake and parking brake. In certain embodiments, the braking system has a brake pack of interleaved friction disks and plates respectively fixed to one or the other of the axle hub and the output hub. An actuator selectively engages the friction disks with the plates. The wheel brake is mounted radially between the decreased-diameter section of the trumpet housing and the output hub and axially between wheel bearings rotatably supporting the output hub. In this manner, the wheel brake is not inhibited significantly in its radial size by the axle hub or the wheel bearings.

The disclosed powered axle may afford a braking system actuated by hydraulic power, spring force, electromechanical force, or combinations thereof. In certain embodiments, the braking system includes a friction disk brake pack that is spring applied and hydraulically released (SAHR). In a driving mode of operation with the brake disengaged (permitted wheel rotation), hydraulic power from the work vehicle is applied to a first actuator piston to compress a spring (e.g., a Belleville spring) and hydraulic power is not applied to a second actuator piston adjacent the brake pack. For engaging the brake in a service brake mode of operation, hydraulic power is applied to the second actuator piston to engage the brake, while the first actuator piston continues to compress the spring. In a park mode, both the first and second actuator pistons are relieved of hydraulic power, permitting the spring to expand, press both actuator pistons against the brake pack, and engage the brake.

In certain embodiments, the powered axle includes either a single electric motor or multiple electric motors (e.g., two permanent magnet electric motors). Each motor is inboard of the wheel hubs and has a rotating drive shaft providing power to an axle gear set. When multiple electric motors are utilized, the axle gear set may include an input gear set, which provides a gear ratio reduction to match the input speed of a single electric motor embodiment. The powered axle may thus be changed from a single motor to a dual motor set-up by replacing the single motors with two motors and the input gear set.

In certain embodiments, the powered axle includes a multi-speed transmission, which in some embodiments has first and second stages. The first stage gear set receives power from the motor or motors (e.g., via an input gear set if multiple motors are present). The first stage gear set drives an intermediate shaft extending axially, at least in part, within the axle hub inside the output hub and the wheel hub(s). The intermediate shaft drives the second stage gear set, which turns the output hub, and thereby the wheel hub(s) and the wheel(s), to propel the work vehicle. In certain embodiments, the first and second stage gear sets may be planetary or internal ring gear sets. The second stage gear set may be in an outboard position that allows ready removal/replacement. Different second stage gear sets can provide different gear reduction ratios for different diameter wheels while the remaining parts of the powertrain are unchanged. The transmission is mounted to the axle hub with the radially enlarged inboard end accommodating the first stage gear set. In certain embodiments, in addition to being mounted about the decreased diameter at the output end of the axle hub, the wheel brake is positioned, at least in part, axially between the first stage gear set and the second stage gear set of the transmission.

In still other embodiments, the powered axle disclosed may exhibit few leak paths (e.g., through bolted joints) and avoid the need for metal face seals because the braking system has a more direct force transmission path to engage the wheel hubs without intervening structures and linkages. Some components of the powered axle may also be easier to access for service by being located in a more accessible outboard locations and/or with fewer external parts surrounding them. For example, the brakes may be relatively unobstructed by certain transmission components or the wheel hubs, such that the brake disk pack can be accessed directly upon removal of the output hub. In this sense, certain components of the powered axle (e.g., the brake disk pack and the second stage of the transmission) may be considered modular and readily removed, repaired, and/or replaced with the identical or other replacement parts to give the powered axle the same or different operational characteristics (e.g., a different gear ratio or braking capacity).

The following describes one or more example implementations of the disclosed powered axle. Discussion herein may sometimes focus on the example application of a powered axle in very high load capacity rigid frame dump truck, but the disclosed powered axle is applicable to other types of lower-capacity self-propelled or towed work vehicles, including various other construction machines (e.g., scrapers, articulated dump trucks, loaders, and the like) as well as various agriculture or forestry machines (e.g., agricultural tractors, forestry skidders, and so on). Also, while the following describes the power axle in the context of a dual wheel arrangement in which the axle turns two wheels at each end (that is, each left/right side of the vehicle), aspects of the disclosure are applicable to powered axles for single-wheel applications, especially in such vehicles having wheels with wide wheel hubs (e.g., certain self-propelled sprayers sometimes referred to as "floaters").

Example Embodiments of Work Vehicle and Powered Axle

Figure 1:
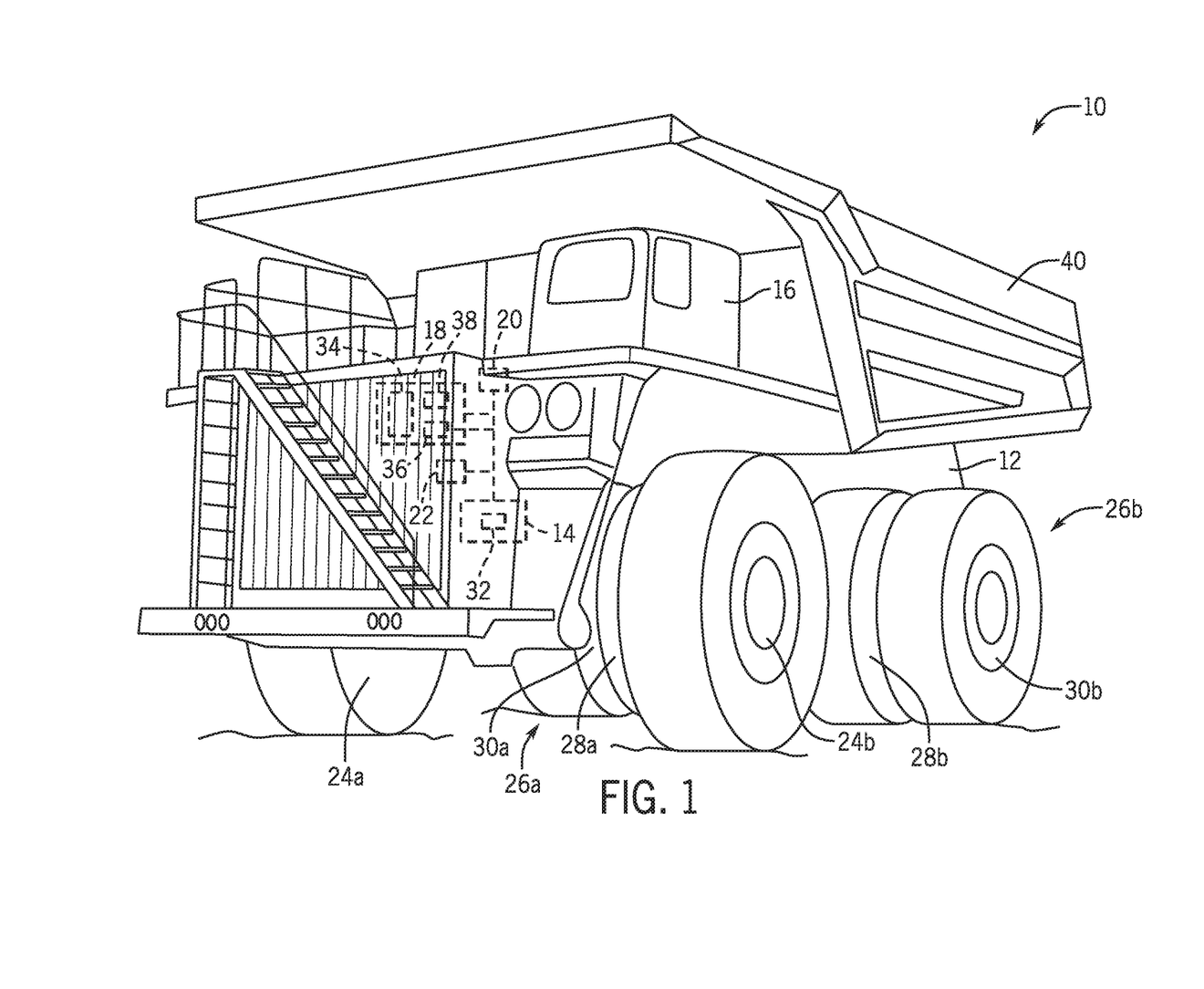
FIG. 1 is a simplified perspective view of an example work vehicle in the form of a heavy-duty rigid frame dump truck in which a powered axle may be used in accordance with this disclosure.

Referring to FIG. 1, in some embodiments, the disclosed work vehicle 10 may be a rigid frame mining truck, although, as noted, the powered axle described herein may be applicable to a variety of machines, such as on-highway trucks, construction vehicles, and agricultural vehicles. As shown, the work vehicle 10 may be considered to include a structural main frame or chassis 12, a drive train 14, an operator platform or cabin 16, a power train 18, a control system 20, and a hydraulic system 22. The work vehicle 10 may be supported off the ground by ground-engaging wheels or tracks. In the illustrated example, the work vehicle 10 includes a front axle (not shown) mounting a pair of single left/right steerable wheels 24a, 24b (one at each left/right lateral side of the work vehicle 10) and a rear axle (not shown in FIG. 1) mounting a pair of dual wheel arrangements 26a, 26b (one pair at each left/right side of the work vehicle 10). The dual wheel arrangements 26a, 26b each include an inboard wheel 28a, 28b and an outboard wheel 30a, 30b, with each inboard/outboard wheel of each dual wheel arrangement 26a, 26b, and each dual wheel arrangement 26a, 26b, being aligned coaxially along a rotation axis R. The dual wheel arrangements 26a, 26b are mounted to opposite ends of the rear axle for rotation about the rotation axis R during travel of the work vehicle 10, and, as described below, the rear axle is a powered axle configured according to this disclosure. It should be noted that the dual wheel arrangements 26a, 26b could be steerable in addition the front wheels 24a, 24b, and also that the front wheels 24a, 24b may be mounted to a powered axle in addition to the dual wheel arrangements 26a, 26b.

Generally, the drive train 14 has wheel steering components 32, including various devices (e.g., power steering pumps and lines, steering mechanisms, and the like) that couple manual (e.g., operator steering controls or wheel) and/or automated (via the control system 20) steering input to the wheels, such as the steerable front wheels 24a, 24b. The power train 18 includes a source of propulsion, such as an engine 34, which supplies power to the work vehicle 10, as either direct mechanical power or after being converted to electric or hydraulic power. In one example, the engine 34 is an internal combustion engine, such as a diesel engine, that is controlled by an engine control module (not shown) of the control system 20. It should be noted that the use of an internal combustion engine is merely an example, as the source of propulsion may be a fuel cell, an electric motor, a hybrid-gas electric motor, or other power-producing devices. In addition to providing tractive power to propel the work vehicle 10, the engine 34 may provide power to various onboard subsystems, including various electrical and hydraulic components of the work vehicle, and for off-boarding power to other sub-systems remote from the work vehicle 10. For example, the engine 34 may provide mechanical power that is converted to an electric format to run the electronics of the control system 20 and one or more electric drives of the work vehicle 10. The power train 18 thus may have mechanical to electrical power conversion components 36, one or more batteries 38, and associated electronics, including various alternators, generators, voltage regulators, rectifiers, inverters, and the like. The engine 34 may also provide mechanical power that is converted to hydraulic format to power various pumps and compressors that pressurize fluid to drive various actuators of the hydraulic system 22 in order to power wheel steering and braking and various work implements onboard the work vehicle 10. In this example, the work vehicle 10 has a load or dump bin 40 that may be raised and lowered during a dumping operation by one or more hydraulic piston-cylinder devices. The hydraulic system 22 may be coupled to and operated by the control system 20 in response to commands from an operator input device (e.g., operator controls, operator display device, etc.) in the cabin 16 or remote from the work vehicle 10. The hydraulic system 22 may include other components (e.g., valves, flow lines, pistons/cylinders, seals/gaskets, and so on), such that control of various devices may be effected with, and based upon, hydraulic, mechanical, or other signals and movements.

The control system 20 may be configured as a computing device with associated processor devices and memory architectures, as a hard-wired computing circuit (or circuits), as a programmable circuit, as a hydraulic, electrical, or electro-hydraulic controller. The control system 20 may be configured to execute various computational and control functionality with respect to the work vehicle 10, including various devices associated with the drive train 14, the power train 18, the hydraulic system 22, and various additional components of the work vehicle 10. In some embodiments, the control system 20 may be configured to receive input signals in various formats (e.g., as hydraulic signals, voltage signals, current signals, and so on), and to output command signals in various formats (e.g., as hydraulic signals, voltage signals, current signals, mechanical movements, and so on). The control system 20 may also be configured to operate various aspects of the powered axle, which forms part of the drive and power trains 14, 18 of the work vehicle 10.

Figure 2:
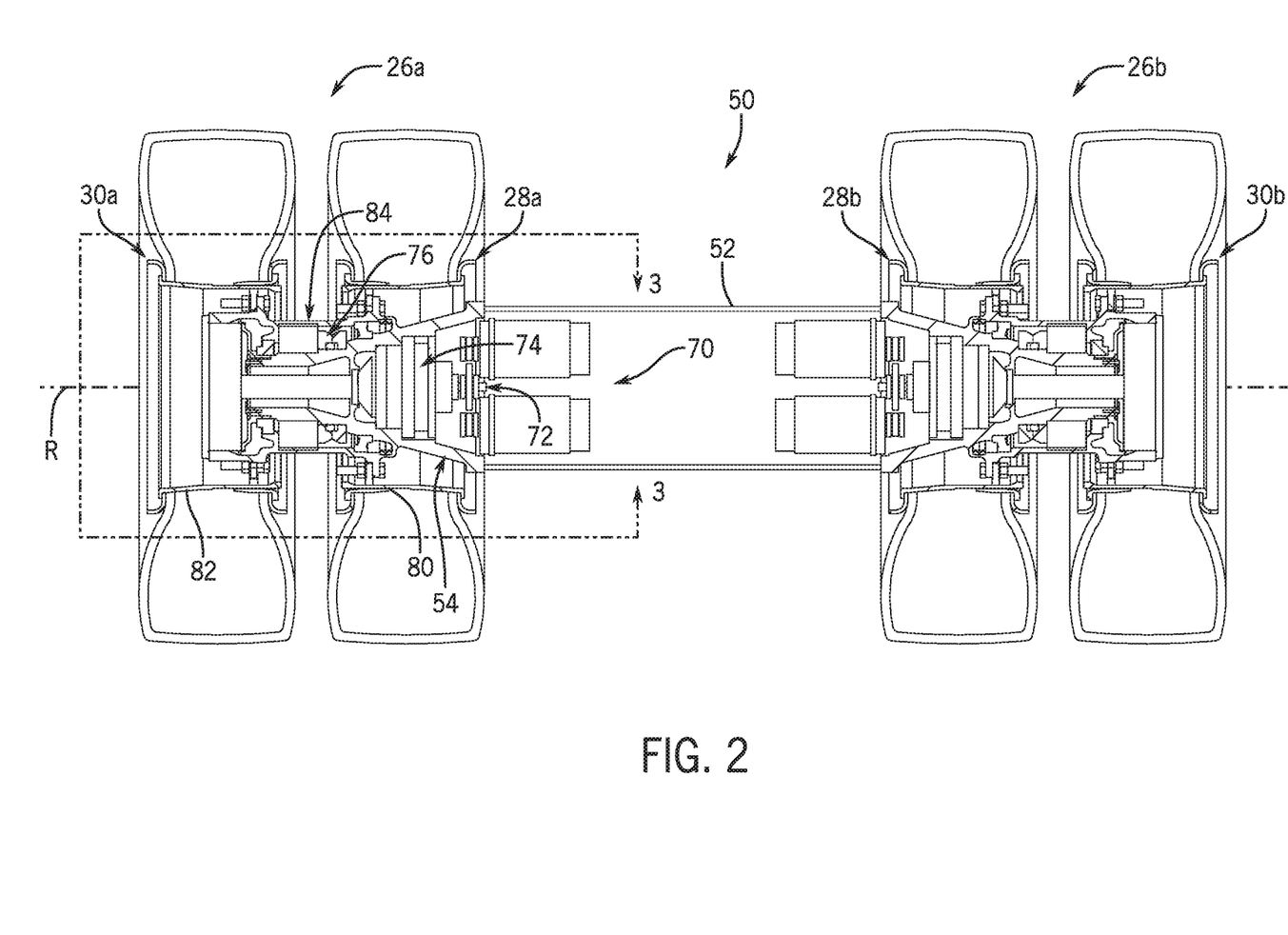
FIG. 2 is a schematic cross-sectional view of an example powered axle with dual wheel arrangements at each end for the example work vehicle of FIG. 1.
Figure 2A:
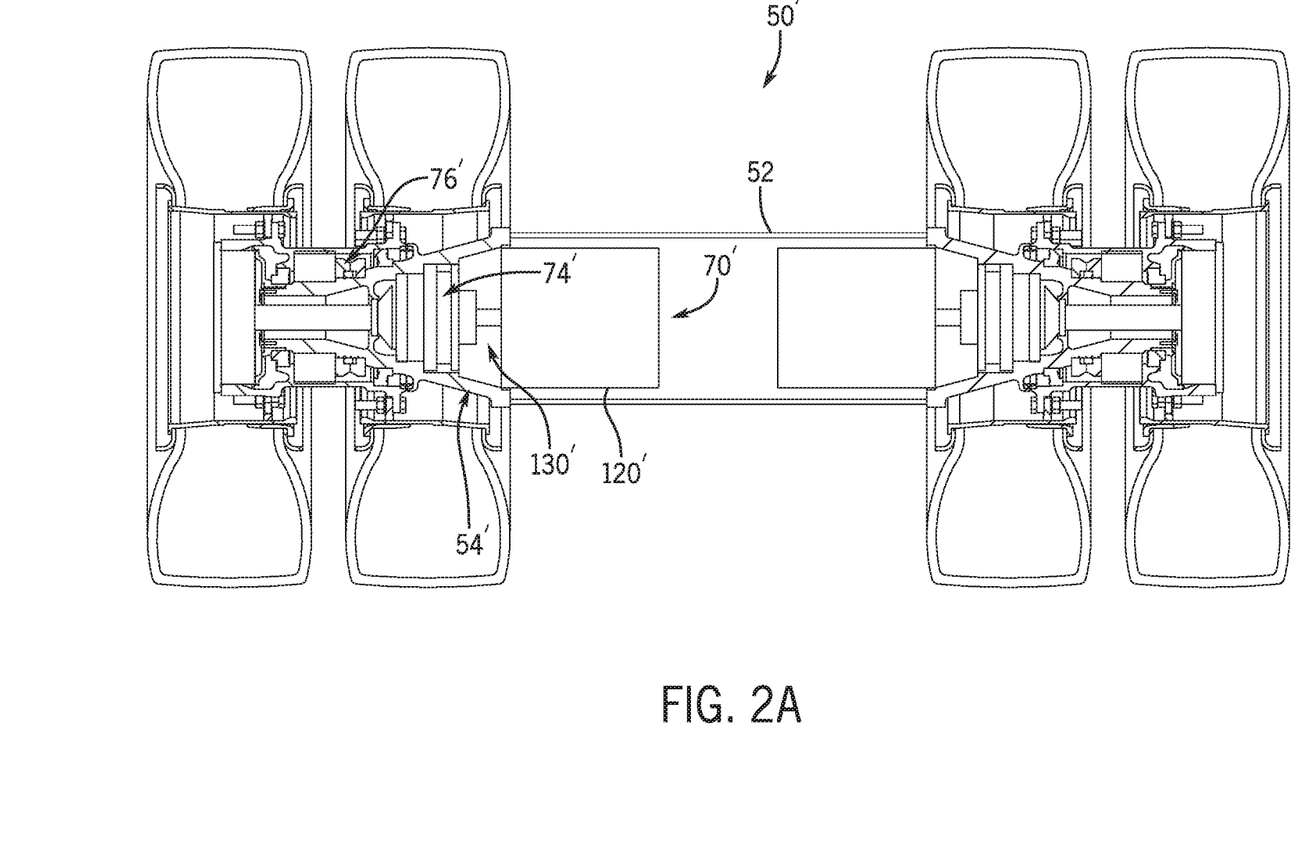
FIG. 2A is a view similar to FIG. 2 showing another example powered axle.

Referring also to FIG. 2, an example powered axle 50 has an axle housing 52 that is fixedly mounted to the frame or chassis 12 of the work vehicle 10. The axle housing 52 may be of heavy-duty construction (e.g., cast or rolled steel) to support the loads on the work vehicle 10 and of any suitable configuration and number of parts. The example axle housing 52 is shown with a simple cylindrical annular shape for simplicity. At each end of the axle housing 52 is one of the dual wheel arrangements 26a, 26b as well as power transmission, brake and housing components that facilitate mounting and rotation of the dual wheel arrangements 26a, 26b. In some embodiments, these components at each end of the axle housing 52 are identical or mirror image parts such that the components at only one end of the axle housing 52 will be detailed herein. It should be understood that the description below of the left end of the axle housing 52 (from the perspective of FIG. 2) may thus be considered a description of the corresponding components at the right end of the axle housing 52. It should also be understood that in some embodiments the components at the left end of the axle housing 52 may differ from those at the right end, including being as shown in FIG. 2A, discussed below.

Figure 3:
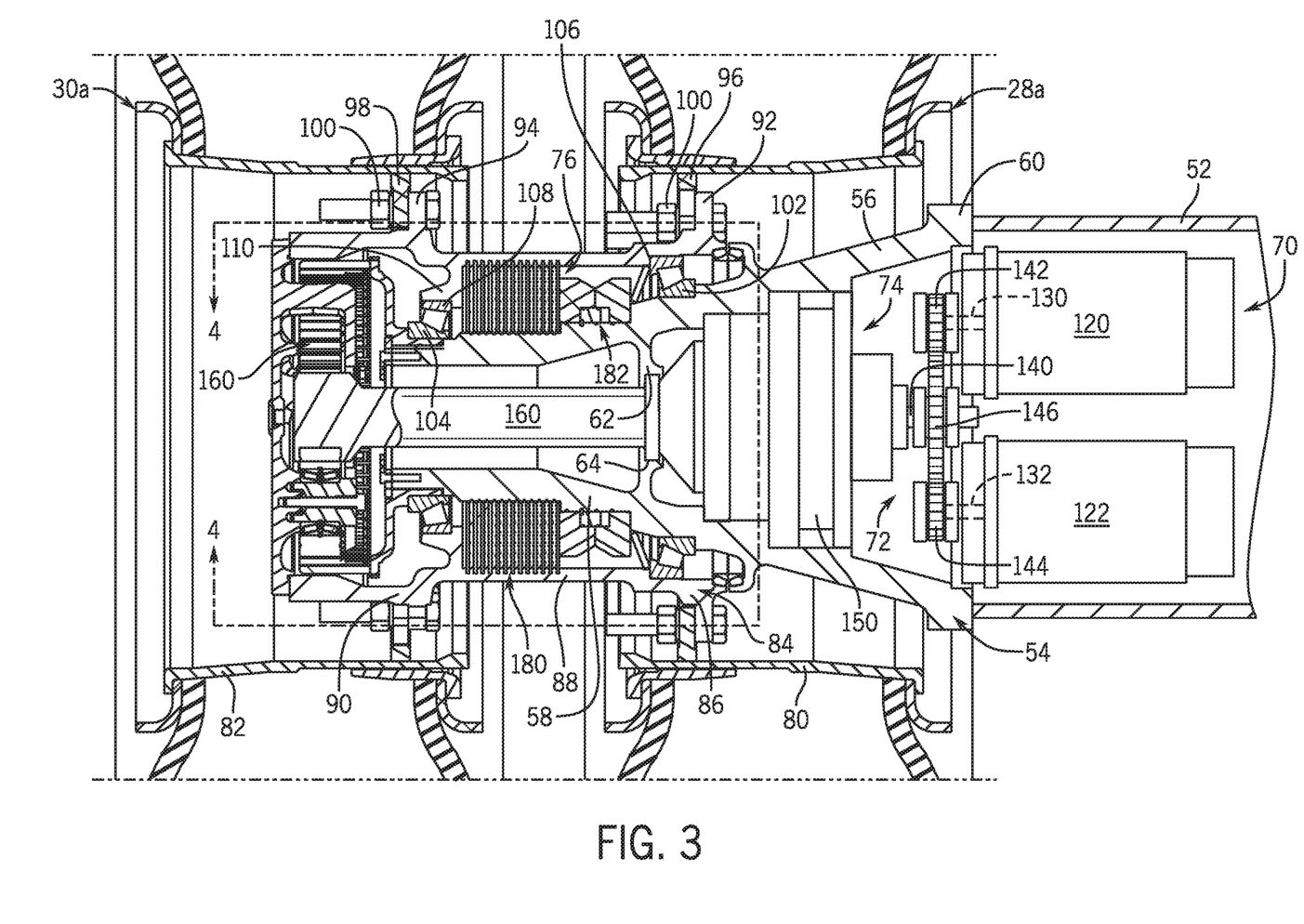
FIG. 3 is an enlarged partial cross-sectional view of the example powered axle taken at area 3-3 of FIG. 2.

Referring now also to FIG. 3, an axle hub 54 is mounted (e.g., bolted) in fixed position to the axle housing 52. The axle hub 54 may have a generally bell or trumpet geometry including a flared input end 56 and an annular output end 58. The input end 56 tapers outwardly (from right to left in FIG. 3) from a large diameter flange 60 progressively narrowing to the output end 58, which has a generally cylindrical configuration with a nominal outer diameter that is smaller relative to both the flange 60 and the narrowest portion of the input end 56. The axle hub 54 has an intermediate partition 62 between the input end 56 and the output end 58 with an opening 64. Both the input end 56 and the output end 58 are open-ended and have a hollow interior in communication with the opening 64 in the partition 62.

The axle hub 54 mounts the power transmission and brake components of the powered axle 50, including an electric drive 70, input gear set 72, transmission gear set 74 and wheel brake assembly 76, as detailed below. The axle hub 54 also mounts the dual wheel arrangement 26a for rotation about the rotation axis R.

Specifically, the inboard and outboard wheels 28a, 30a include associated wheel hubs 80, 82. The wheel hubs 80, 82 may have an annular configuration, in one piece or an assembly of parts, suitable to mount and support tires. In the illustrated example, the outboard wheel hub 82 is identical to inboard wheel hub 80, however, they wheel hubs may differ. The wheel hubs 80, 82 are mounted to an output hub 84, which likewise has an annular configuration made of one piece or an assembly of parts. As illustrated, the output hub 84 has an inboard end 86, a central waist section 88, and an outboard end 90. The inboard end 86 has a first hub flange 92, and the outboard end 90 has a second hub flange 94. The output hub 84, and the output end 58 of the axle hub 54, span the axial gap between the inboard and outboard wheels 28a, 30a and extend axially partially into each wheel hub 80, 82. In the illustrated example, the first and second hub flanges 92, 94 of the output hub 84 and internal flanges 96, 98 of the wheel hubs 80, 82 receive bolts 100 to mount the wheel hubs 80, 82 for co-rotation with the output hub 84 about the rotation axis R. Wheel bearings 102, 104 mount the output hub 84, and thereby the wheel hubs 80, 82, to the axle hub 54. The wheel bearing 102 is located inboard and proximate the inboard wheel hub 80, and the wheel bearing 104 is located outboard and proximate the outboard wheel hub 82. The wheel bearings may identical, but in the illustrated example, they differ in diameter (the inboard wheel bearing 102 being larger than the outboard wheel bearing 104) as they are located to be approximately radially aligned of with the hub flanges 92, 94 where the output end 58 of the axle hub 54 has different outer diameters. This is accommodated by the internal structure 110 of the output hub 84 defining a different internal diameters at the location of the outboard wheel bearings 104. The wheel bearings 102, 104 may bear both axial and radial loads, and may be tapered rolling bearings (with roller elements between relatively rotatable inner and outer rings) that are mounted with opposite axial orientations to accommodate axial loads in opposite axial directions. The wheel bearings 102, 104 engage the inner diameter sections of the output hub 84 and the outer diameter sections of the output end 58 of the axle hub 54 in a press-fit so that the outer rings of the wheel bearings 102, 104 co-rotate about the rotation axis R with the output hub 84 relative to the inner rings and the axle hub 54, which are relatively fixed. The wheel bearings 102, 104 abut shoulders 106, 108 of the output end 58 of the axle hub 54 to further fix their axial mounting positions.

Figure 4A:
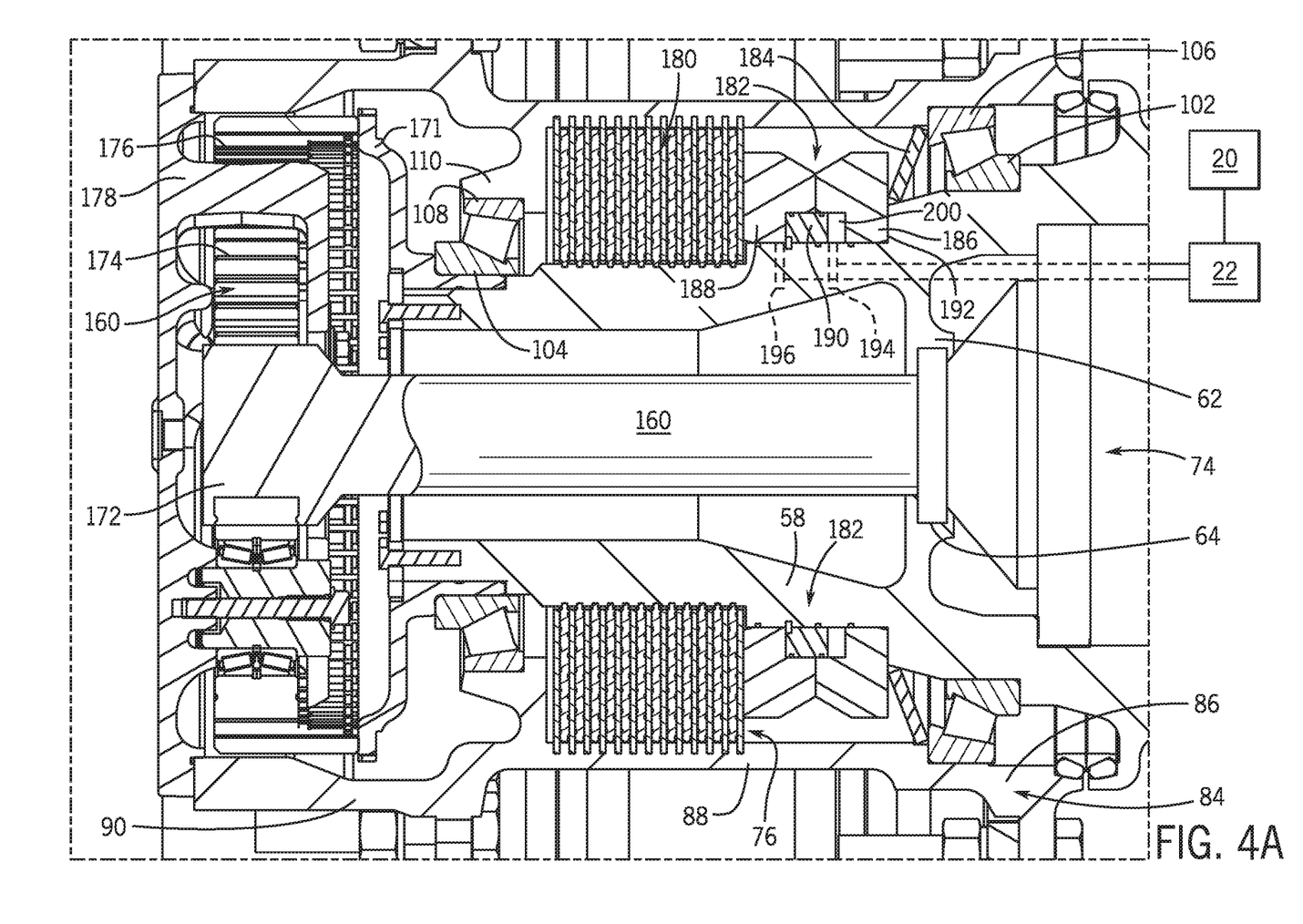
FIG. 4A is an enlarged cross-sectional view thereof taken at area 4-4 of FIG. 3 and depicted in a drive state with an example brake arrangement shown disengaged.

Referring now also to FIG. 4A, the electric drive 70 may include two electric motors or e-machines 120, 122 at least partially, if not entirely, positioned within the axle housing 52. In some embodiments, the e-machines 120, 122 may be permanent magnet type motors that are generally smaller, lighter, less expensive and lower speed that other types of electric motors, such as a large induction motors, used in some electrically powered vehicles. The use of two (or more) motors allows for further size, cost and capacity reduction of the individual motors, as compared to single-motor implementations. As one example, each e-machine 120, 122 may output up to 400 kW at speeds of 0-4,000 RPM.

The electric drive 70 is powered by, or part of, the power train 18 and receives power from the prime power source of the work vehicle 10. In some embodiments, the prime power source is the engine 34, which provides mechanical power that is converted to electrical power through the power conversion components 36 (e.g., one or more main or dedicated alternators or generators) and the one or more batteries 38 of the power train 18. The power conversion components 36 of the power train 18 may convert the mechanical power from the engine 34 into either alternating or direct current (AC or DC) electrical power. Associated power electronics (e.g., rectifiers, inverters, voltage regulators and amplifiers) may be employed to convert between AC or DC format and provide the necessary voltage and current according to the power requirements of the e-machines 120, 122. DC electrical power may be stored in the one or more batteries 38.

The electric drive 70 is coupled to the transmission gear set 74 though the input gear set 72. The input gear set 72 is connected to output shafts 130, 132 of the e-machines 120, 122 and to an input shaft 140 of the transmission gear set 74. In the illustrated example, the input gear set 72 includes input gears 142, 144 rotationally fixed to the output shafts 130, 132 of the respective e-machines 120, 122. The input gears 142, 144 mesh with a gear 146 fixed to the input shaft 140. In this manner, rotation of the substantially parallel output shafts 130, 132 of the e-machines 120, 122 is converted to rotation of the input shaft 140 of the transmission gear set 74 at a different speed and torque than at the e-machine output shafts 130, 132.

In general, the transmission gear set 74 functions to receive power input from the e-machines 120, 122 and output power to the output hub 84, and thereby the wheel hubs 80, 82 and ultimately the dual wheel arrangement 26a. The transmission gear set 74 provides the proper gear ratio to output a combination of speed and torque to the dual wheel arrangement 26a over the operational travel of the work vehicle 10. For example, under extremely heavy loads, the work vehicle 10 may operate at a very low-speed creeper mode (e.g. 1-2 MPH), which requires very high torque to the wheels 28a, 30a. When unloaded or under less load, or during transit on-road or smooth terrain, the work vehicle 10 may operate at relatively high speeds (e.g., 40+ MPH). To accommodate such wide speed and torque range, the transmission gear set 74 may be configured to provide changeable gear ratios, either by manual selection by the operator through a dedicated control linked mechanically and/or electrically or electro-hydraulically to the transmission gear set 74 or automatically under the control logic of the control system 20. For example, the transmission gear set 74 may be a multi-speed transmission, such as a three-speed transmission, having an epicyclic first stage gear set 150. The transmission gear set 74 may include various transmission components, such as various clutch packs, actuators, biasing members, and the like, that are not shown in the drawings.

The first stage gear set 150 of the transmission gear set 74 couples the input shaft 140 to an intermediate shaft 160 extending in an axially outboard direction (to the left in FIG. 4A). In the illustrated example, the first stage gear set 150 is positioned within the flared input end 56 of the axle hub 54 radially inside of the inboard wheel hub 80, and the intermediate shaft 160 extends axially to span the axial gap between the inboard wheel hub 80 and the outboard wheel hub 82, passing through the opening 64 in the partition 62 and the center of the output end 58 of the axle hub 54. The intermediate shaft 160 couples to the output hub 84 through a second stage gear set 170 that has a housing 171 fixed (e.g., bolted) to an outboard end of the axle hub output end 58.

The second stage gear set 170 may be an epicyclic gear set. The intermediate shaft 160 may have an outboard end that serves as a sun gear 172. Although the sun gear 172 is illustrated as a sun shaft integrally part of the intermediate shaft 160, a separate sun gear may be fixed to the intermediate shaft 160 for co-rotation therewith. The sun gear 172 meshes with a plurality of planet gears 174 (e.g., three planet gears) that revolve around the sun gear 172. A ring gear 176 is fixed to the housing 171 and has internal splines or teeth that mesh with the planet gears 174 as they revolve about the sun gear 172. The planet gears 174 are mounted to a carrier 178 on planet shafts and may be rotationally supported by one or more bearings. The carrier 178 is fixed to the output hub 84. In this arrangement, the intermediate shaft 160, the sun gear 172, the ring gear 176, the carrier 178, and the output hub 84 are coaxially aligned, and axially and radially within the outboard wheel hub 82 (see FIG. 3). The sun gear 172 drives the plurality of planet gears 174 to revolve within the ring gear 176, which does not rotate. Orbiting of the planet gears 174 causes rotation of the carrier 178, and thus rotation of the output hub 84 and the wheel hubs 80, 82. Accordingly, the intermediate shaft 160 functions to drive the second stage gear set 170, which provides additional gear reduction before driving the output hub 84 and the wheel hubs 80, 82.

As noted, the second stage gear set 170 is located at an outboard end of the transmission gear set 74 within the outboard wheel hub 82 of the outboard wheel 30a and is readily accessible for service or replacement from the outboard side of the work vehicle 10 with the outboard wheel 30a removed. The transmission gear set 74 may be modified to effect different gear ratios by replacing the second stage gear set 170 with a gear set having a different gear ratio. This may allow transmission gear set 74 to operate with the speed and torque characteristics appropriate for various work vehicles having substantially similar designs but different performance or capacity or operated to carry different loads. In one example, a work vehicle may require larger wheels when carrying larger loads. However, changing the wheel size may change the speed and torque values at the wheels. To avoid suboptimal performance, a different second stage gear set may be installed in the powered axle 50 to provide the torque and speed desired.

The powered axle 50 also includes a wheel brake assembly 76. The single wheel brake assembly 76 provides both the service brake and the park brake for the work vehicle 10. In particular, the powered axle 50 is operable in different brake modes, including a drive mode in which the wheel brake assembly 76 is disengaged (FIG. 4A), a service brake mode with the wheel brake assembly 76 selectively engaged (FIG. 4B), and a park brake mode with the wheel brake assembly 76 engaged (FIG. 4C).

In general, the wheel brake assembly 76 has a brake or disk pack 180, including interleaved friction disks and backing plates, and an actuator 182 configured to selectively engage and disengage the friction disks with the plates of the disk pack 180. The number of friction disks and plates may be varied, for example, based on the required braking force. In the illustrated example of FIGS. 4A-4C, the actuator 182 engages the disk pack 180 by pressing the friction disks and plates together in one axial direction, the outboard direction in this example. The disk pack 180 is coupled to the axle hub 54 (which does not rotate relative to the chassis 12 of the work vehicle 10) and the output hub 84 (which rotates about the rotation axis R). In the illustrated example, the plates are fixedly mounted to the axle hub 54 (at its output end 58) and the friction disks are fixedly mounted to the output hub 84. However, this could be reversed so that the friction disks mount to the axle hub 54 and the plates mount to the output hub 84. Also, in the illustrated example, the internal structure 110 of the output hub 84 retains the disk pack 180 from moving in the outboard axial direction.

In the illustrated example, the actuator 182 of the wheel brake assembly 76 is spring-applied and hydraulically-released, and thus may be referred to as an SAHR actuator. As an alternative to the illustrated SAHR actuator, the actuator may be hydraulically-applied, spring-released (HASR) or provided with another device for engaging the disk pack 180, such as an electro-mechanical or electro-hydraulic device. A spring 184, for example a Belleville spring, is mounted about the output end 58 of the axle hub 54 proximate the inboard wheel bearing 102. The spring 184 is configured to provide a parking brake function when acting on the actuator 182 in a way that moves the disk pack 180 in the outboard axial direction to press together the friction disks and plates. The actuator 182 includes a first actuator piston 186 and a second actuator piston 188 that are mounted about the output end 58 of the axle hub 54 between the spring 184 and the disk pack 180. Each actuator piston 186, 188 is configured to provide braking functions by selectively moving in either inboard or outboard axial direction under hydraulic pressure. A partition 190 (such as a snap ring or similar fixed structure) is fixedly mounted on the output end 58 of the axle hub 54 axially between the actuator pistons 186, 188. The second actuator piston 188 can move axially between the disk pack 180 and the partition 190. The first actuator piston 186 can move axially between the partition 190 and a shoulder 192 of the axle hub 54 and may press against the spring 184. In alternative embodiments, the relative position of the disk pack 180 and the actuator 182 may be reversed, with the disk pack 180 located axially inboard relative to the work vehicle 10.

The actuator 182 of the wheel brake assembly 76 may be powered by hydraulic fluid from the hydraulic system 22. A plurality of hydraulic ports 194, 196 may provide hydraulic fluid from the hydraulic system 22 to pressure chambers 200, 202. The second port 196 is located proximate the second actuator piston 188 and outboard of the partition 190, selectively providing pressure to the second pressure chamber 20 to force the second actuator piston 188 axially toward the disk pack 180. The first port 194 is located proximate the first actuator piston 186 and inboard of the partition 190, selectively providing pressure to the first pressure chamber 200 to force the first actuator piston 186 axially away from the disk pack 180 and against the spring 184. Brake disengagement may be achieved in various ways, including centrifugal force tending to separate the friction disks and plates after pressure is relieved from second actuator piston 188 or by internal case pressure within the disk pack 180.

The components of the wheel brake assembly 76 are located radially with a complementary fit relative to the inboard and outboard wheels 28a, 30a, the output hub 84, and the transmission gear set 74. Generally, the wheel brake assembly 76 is mounted around the output end 58 of the axle hub 54. As previously stated, the output end 58 of the axle hub 54 has a reduced diameter relative to the rest of the axle hub 54. The wheel brake assembly 76 is disposed, at least in part, between the wheel hubs 80, 82. By virtue of such a structural arrangement, the available space envelope in the radial dimension for the friction disks and plates of the disk pack 180 is constrained only by the output hub 84 and the axle hub 54 dimensions, without concern for other components. A large radial envelope for large friction disks and plates of the disk pack 180 provides for enhanced braking power of the wheel brake assembly 76.

The wheel brake assembly 76 is also mounted in an advantageous axial position between the inboard and outboard wheels 28a, 30a, and specifically axially between the first stage gear set 150 and the second stage gear set 170, and more specifically between the inboard and outboard ends 86, 90 of the output hub 84 and also between the wheel bearings 102, 104. Therefore, the size and arrangement of the wheel brake assembly 76, particularly the disk pack 180, are not obstructed by these components. This axial space allows for a greater number of friction disks and plates in the disk pack 180, as needed, allowing for enhanced braking capacity. Moreover, the first hub flange 92 of the output hub 84 may be sized to accommodate a desired size of the disk pack 180. In addition to the relatively large envelope, the wheel brake assembly 76 is positioned between and near both of the wheel hubs 80, 82 such that the wheel brake assembly 76 directly engages the output hub 84 at a position at least partially between the wheel hubs 80, 82. The output hub 84 is directly affixed to each of the wheel hubs 80, 82. Therefore, the wheel brake assembly 76 has a direct route for transmission of braking force to the wheel hubs 80, 82.

To disengage the disk pack 180 of the wheel brake assembly 76, the hydraulic system 22 is controlled to open hydraulic pressure to the first pressure chamber 200 via port 194 and to vent the second pressure chamber 202 to tank via port 196. This causes the first actuator piston 186 to move in the axially inboard direction to retract the spring 184, and to allow the second actuator piston 188 to release the disk pack 180, as shown in FIG. 4A. In this state, the powered axle 50 operates in a driving mode to turn the wheels 28a, 30a without being resisted by the wheel brake assembly 76.

Figure 4B:
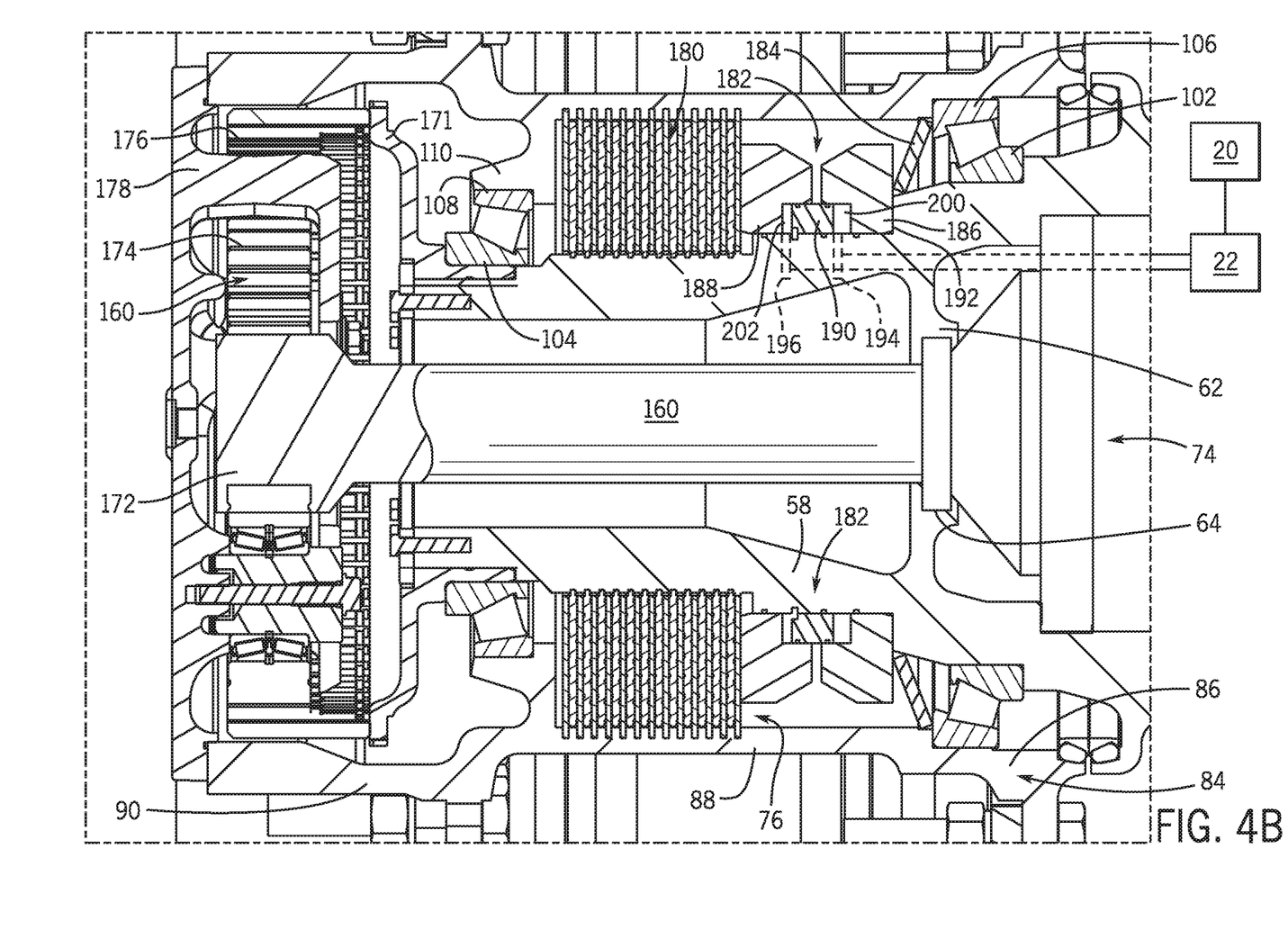
FIG. 4B is a view similar to FIG. 4A showing the example powered axle in a service brake state with the example brake arrangement engaged.
Figure 4C:
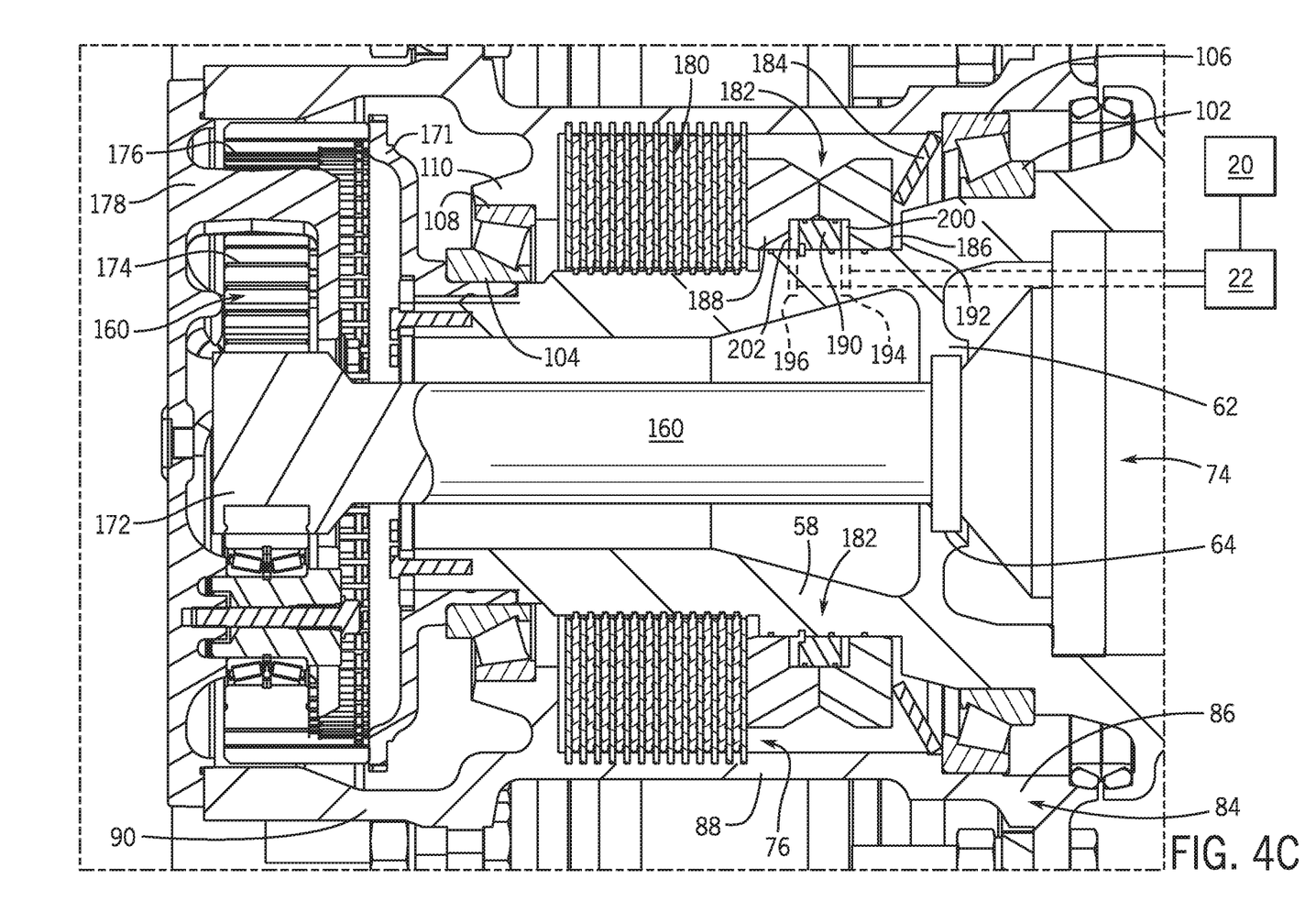
FIG. 4C is a view similar to FIG. 4A showing the example powered axle in a park brake state with the example brake arrangement engaged.

As shown in FIG. 4B, to engage the wheel brake assembly 76, the hydraulic system 22 is controlled to direct hydraulic fluid to the second pressure chamber 202 via port 196 to move the second actuator piston 186 in the axially outboard direction to engage the friction disks and plates of the disk pack 180. Hydraulic fluid may pressurize the second pressure chamber 200 to hold the first actuator piston 186 axially inboard to retract the spring 184, so that only the second actuator piston 188 acts on the disk pack 180 under hydraulic control. In this state, the powered axle 50 operates in a service brake mode for selectively applying the wheel brake assembly 76 to slow or arrest rotation of the wheels 28a, 30a.

The powered axle 50 operates in a park mode shown in FIG. 4C by controlling the hydraulic system 22 to relieve hydraulic pressure from both of the first and second pressure chambers 200, 202 by allowing hydraulic fluid to exit via the ports 194, 196 and return to tank. With hydraulic pressure relieved, the spring 184 moves the first actuator piston 186 in the axially outboard direction to engage the second actuator piston 188 and thereby also move the second actuator piston 188 to engage the disk pack 180. Mechanical spring force thus maintains the powered axle 50 in the park brake mode, preventing rotation of the wheels 28a, 30a, until the spring force is overcome by hydraulic pressure.

The foregoing describes one or more example powered axles in detail. Various other configurations are possible within the scope of this disclosure. For example, the above-described powered axle utilizes an electric drive having a parallel arrangement of two e-machines. However, the powered axle may be configured with a single-motor electric drive. Referring to FIG. 2A, a powered axle 50' may have an electric drive 70' with a single motor, e-machine 120', providing input power to a transmission gear set 74'. In this example, the e-machine 120' has a single output shaft 130' that serves as the input shaft coupling directly to the transmission gear set 74'. Therefore, this example omits the input gear set of the two-motor electric drive described above, since the single e-machine 120' and the transmission gear set 72' can be designed to provide the speed and torque requirements needed for the powered axle 50' without the need for intervening gear reduction before the transmission gear set 74'. The same is true for the above-described example with two motors. However, the input gear set 72 allows the transmission gear set to remain the same for both the single-motor and two-motor powered axle configurations. This provides a further modularity aspect of the disclosed powered axle in that the electric drive can be changed by swapping the motors and adding or removing the input gear set, as needed. Of course, the transmission gear sets 74, 74' could be different, both in structural configuration (e.g., parallel-axis or planetary gears in a single stage or multiple stages) and the gear ratios effected. The powered axle 50' otherwise may be identical to the powered axle 50, including an axle housing 52', an axle hub 54', an output hub 84' and a wheel brake assembly 76', as detailed above.

Enumerated Examples of Work Vehicle and Powered Axle

Also, the following examples are provided, which are numbered for easier reference.

1. A powered axle for a work vehicle having a dual wheel arrangement includes: an axle housing; an axle hub mounted to the axle housing; an output hub having opposite axial ends; one or more wheel bearings supporting the output hub for rotation about the axle hub along a rotation axis; an electric drive disposed, at least in part, within the axle housing; a hub gear set disposed, at least in part, within the axle hub and configured to transmit power from the electric drive to the output hub for rotation of the dual wheel arrangement; and a wheel brake disposed radially between the axle hub and the output hub and axially between the ends of the output hub, the wheel brake configured to selectively permit and arrest rotation of the output hub 2. The powered axle of example 1, wherein the hub gear set includes a first stage gear set and a second stage planetary gear set, and wherein the wheel brake is disposed axially between the first stage gear set and the second stage planetary gear set.

3. The powered axle of example 2, wherein the hub gear set includes an intermediate shaft coupling an output of the first stage gear set with an input of the second stage planetary gear set; and wherein the intermediate shaft, at least in part, extends within the axle hub along the rotation axis.

4. The powered axle of example 1, wherein the axle hub is a trumpet housing having a flared input end and an annular output end having a diameter smaller than the input end; and wherein the one or more bearings are mounted to the output end of the axle hub.

5. The powered axle of example 1, wherein the output hub has a first hub flange and a second hub flange spaced apart axially from the first hub flange; wherein the first hub flange couples the output hub to a first wheel hub of the dual wheel arrangement and the second hub flange couples the output hub to a second wheel hub of the dual wheel arrangement; and wherein the wheel brake is disposed, at least in part, axially between the first wheel hub and the second wheel hub.

6. The powered axle of example 1, wherein the wheel brake includes a disk pack having interleaved friction disks and plates, the friction disks fixed to either the axle hub or the output hub and the plates fixed to the other of the axle hub or the output hub; and an actuator configured to selectively engage and disengage the friction disks with the plates of the disk pack.

7. The powered axle of example 6, wherein the actuator includes: a spring mounted about the axle hub; a first piston mounted about the axle hub; and a second piston mounted about the axle hub on an axial side of a partition opposite the first piston; wherein the actuator defines a first pressure chamber between the first piston and the partition and defines a second pressure chamber between the second piston and the partition. In a first, park brake mode of the wheel brake, the actuator is configured to engage the disk pack by application of a spring force from the spring. In a second, service brake mode of the wheel brake, the actuator is configured to selectively engage the disk pack by application of hydraulic pressure from the first pressure chamber to the first piston, the spring force from the spring being isolated from the first piston by application of hydraulic pressure from the second pressure chamber to the second piston to physically separate the second piston from the first piston.

8. The powered axle of example 1, wherein the electric drive includes one of a single electric motor with a rotating drive shaft coupled to the hub gear set, or multiple electric motors each with a rotating drive shaft and an input gear set coupling the drive shafts to the hub gear set.

9. In further embodiments, a work vehicle is provided that includes: a first wheel having a first wheel hub; a second wheel having a second wheel hub aligned along a common wheel axis with the first wheel; and a powered axle. The powered axle includes: an axle housing; an axle hub mounted to the axle housing; an output hub; one or more wheel bearings supporting the output hub for rotation about the axle hub along a rotation axis. The powered axle also includes: an electric drive disposed, at least in part, within the axle housing; a hub gear set disposed, at least in part, within the axle hub and configured to transmit power from the electric drive to the output hub for rotation of the first wheel hub and the second wheel hub; and a wheel brake disposed radially between the axle hub and the output hub and axially, at least in part, between the first wheel hub and the second wheel hub, the wheel brake configured to selectively permit and arrest rotation of the output hub.

10. The work vehicle of example 9, wherein the hub gear set includes a first stage gear set and a second stage planetary gear set, and wherein the wheel brake is disposed axially between the first stage gear set and the second stage planetary gear set.

11. The work vehicle of example 9, wherein the axle hub is a trumpet housing having a flared input end and an annular output end having a diameter smaller than the input end; and wherein the one or more bearings are mounted to the output end of the axle hub.

12. The work vehicle of example 9, wherein the output hub has a first hub flange and a second hub flange spaced apart axially from the first hub flange; wherein the first hub flange couples the output hub to a first wheel hub of the dual wheel arrangement and the second hub flange couples the output hub to a second wheel hub of the dual wheel arrangement; and wherein the wheel brake is disposed, at least in part, axially between the first wheel hub and the second wheel hub.

13. The work vehicle of example 9, wherein the wheel brake includes a disk pack having interleaved friction disks and plates, the friction disks fixed to either the axle hub or the output hub and the plates fixed to the other of the axle hub or the output hub; and an actuator configured to selectively engage and disengage the friction disks with the plates of the disk pack.

14. The work vehicle of example 13, wherein the actuator includes: a spring mounted about the axle hub; a first piston mounted about the axle hub; and a second piston mounted about the axle hub on an axial side of a partition opposite the first piston; wherein the actuator defines a first pressure chamber between the first piston and the partition and defines a second pressure chamber between the second piston and the partition. In a first, park brake mode of the wheel brake, the actuator is configured to engage the disk pack by application of a spring force from the spring. In a second, service brake mode of the wheel brake, the actuator is configured to selectively engage the disk pack by application of hydraulic pressure from the first pressure chamber to the first piston, the spring force from the spring being isolated from the first piston by application of hydraulic pressure from the second pressure chamber to the second piston to physically separate the second piston from the first piston.

15. The work vehicle of example 9, wherein the electric drive includes one of a single electric motor with a rotating drive shaft coupled to the hub gear set, or multiple electric motors each with a rotating drive shaft and an input gear set coupling the drive shafts to the hub gear set.

CONCLUSION

The examples discussed above result in a variety of benefits of the disclosed powered axle. For example, the hub gearing provides the requisite driving performance for a work vehicle utilizing one or more electric motors, which may be of permanent magnet construction, and thereby may be smaller, less expensive and may operate at lower RPMs than some electric motors, such as a single induction motor. The arrangement and geometry of various components (e.g., axle hub, input shaft, gear set, and output hub) allow for a relatively large available space envelope for mounting the braking system. This envelope, both axial and radial dimensions thereof, enables increased braking power. That is, the large radial dimension allows for larger friction disks and plates to be used in the disk pack, which, in turn, may provide greater braking torque and/or allow fewer friction disks and plates to be used, as needed. The large axial dimension of the available space allows for additional friction disks and plates to be used, if needed. Further, the direct engagement of the braking system to the wheel hubs, provides force transmission without complicated intervening structures. Moreover, the direct force transmission path for braking minimizes oil leak paths and obviates the need for face seals of a more complicated structure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A powered axle for a work vehicle having a dual wheel arrangement, comprising:
    an axle housing;
    an axle hub mounted to the axle housing;
    an output hub having opposite axial ends;
    one or more wheel bearings supporting the output hub for rotation about the axle hub along a rotation axis;
    an electric drive disposed, at least in part, within the axle housing;
    a hub gear set disposed, at least in part, within the axle hub and configured to transmit power from the electric drive to the output hub for rotation of the dual wheel arrangement; and
    a wheel brake disposed radially between the axle hub and the output hub and axially between the ends of the output hub, the wheel brake configured to selectively permit and arrest rotation of the output hub, wherein the wheel brake includes:
        a disk pack having interleaved friction disks and plates, the friction disks fixed to either the axle hub or the output hub and the plates fixed to the other of the axle hub or the output hub; and
        an actuator configured to selectively engage and disengage the friction disks with the plates of the disk pack, wherein the actuator includes:
            a spring mounted about the axle hub;
            a first piston mounted about the axle hub; and
            a second piston mounted about the axle hub on an axial side of a partition opposite the first piston;
        wherein the actuator defines a first pressure chamber between the first piston and the partition and defines a second pressure chamber between the second piston and the partition;
        wherein, in a first, park brake mode of the wheel brake, the actuator is configured to engage the disk pack by application of a spring force from the spring; and
        wherein, in a second, service brake mode of the wheel brake, the actuator is configured to selectively engage the disk pack by application of hydraulic pressure from the first pressure chamber to the first piston, the spring force from the spring being isolated from the first piston by application of hydraulic pressure from the second pressure chamber to the second piston to physically separate the second piston from the first piston.

2. The powered axle of claim 1, wherein the hub gear set includes a first stage gear set and a second stage planetary gear set.

3. The powered axle of claim 2, wherein the wheel brake is disposed axially between the first stage gear set and the second stage planetary gear set.

4. The powered axle of claim 3, wherein the hub gear set includes an intermediate shaft coupling an output of the first stage gear set with an input of the second stage planetary gear set; and
wherein the intermediate shaft, at least in part, extends within the axle hub along the rotation axis.

5. The powered axle of claim 1, wherein the axle hub is a trumpet housing having a flared input end and an annular output end having a diameter smaller than the input end; and
wherein the one or more bearings are mounted to the output end of the axle hub.

6. The powered axle of claim 1, wherein the output hub has a first hub flange and a second hub flange spaced axially from the first hub flange;
wherein the first hub flange couples the output hub to a first wheel hub of the dual wheel arrangement and the second hub flange couples the output hub to a second wheel hub of the dual wheel arrangement; and
wherein the wheel brake is disposed, at least in part, axially between the first hub flange and the second hub flange.

7. The powered axle of claim 1, wherein the electric drive includes a single electric motor with a rotating drive shaft coupled to the hub gear set.

8. The powered axle of claim 1, wherein the electric drive includes multiple electric motors each with a rotating drive shaft and an input gear set coupling the drive shafts to the hub gear set.

9. A work vehicle, comprising:
a first wheel having a first wheel hub;
a second wheel having a second wheel hub aligned along a common wheel axis with the first wheel; and
a powered axle, comprising:
an axle housing;
an axle hub mounted to the axle housing;
an output hub;
one or more wheel bearings supporting the output hub for rotation about the axle hub along a rotation axis;
an electric drive disposed, at least in part, within the axle housing;
a hub gear set disposed, at least in part, within the axle hub and configured to transmit power from the electric drive to the output hub for rotation of the first wheel hub and the second wheel hub; and
a wheel brake disposed radially between the axle hub and the output hub and axially, at least in part, between the first wheel hub and the second wheel hub, the wheel brake configured to selectively permit and arrest rotation of the output hub, wherein the wheel brake includes:
a disk pack having interleaved friction disks and plates, the friction disks fixed to either the axle hub or the output hub and the plates fixed to the other of the axle hub or the output hub; and
an actuator configured to selectively engage and disengage the friction disks with the plates of the disk pack, wherein the actuator includes:
a spring mounted about the axle hub;
a first piston mounted about the axle hub; and
a second piston mounted about the axle hub on an axial side of a partition opposite the first piston;
wherein the actuator defines a first pressure chamber between the first piston and the partition and defines a second pressure chamber between the second piston and the partition;
wherein, in a first, park brake mode of the wheel brake, the actuator is configured to engage the disk pack by application of a spring force from the spring; and
wherein, in a second, service brake mode of the wheel brake, the actuator is configured to selectively engage the disk pack by application of hydraulic pressure from the first pressure chamber to the first piston, the spring force from the spring being isolated from the first piston by application of hydraulic pressure from the second pressure chamber to the second piston to physically separate the second piston from the first piston.

10. The work vehicle of claim 9, wherein the hub gear set includes a first stage gear set and a second stage planetary gear set.

11. The work vehicle of claim 10, wherein the wheel brake is disposed axially between the first stage gear set and the second stage planetary gear set.

12. The work vehicle of claim 11, wherein the hub gear set includes an intermediate shaft coupling an output of the first stage gear set with an input of the second stage planetary gear set; and
wherein the intermediate shaft, at least in part, extends within the axle hub along the rotation axis.

13. The work vehicle of claim 9, wherein the axle hub is a trumpet housing having a flared input end and an annular output end having a diameter smaller than the input end; and
wherein the one or more bearings are mounted to the output end of the axle hub.

14. The work vehicle of claim 9, wherein the output hub has a first hub flange and a second hub flange spaced apart axially from the first hub flange;
wherein the first hub flange couples the output hub to a first wheel hub of the dual wheel arrangement and the second hub flange couples the output hub to a second wheel hub of the dual wheel arrangement; and
wherein the wheel brake is disposed, at least in part, axially between the first wheel hub and the second wheel hub.

15. The work vehicle of claim 9, wherein the electric drive includes a single electric motor with a rotating drive shaft coupled to the hub gear set.

16. The work vehicle of claim 9, wherein the electric drive includes multiple electric motors each with a rotating drive shaft and an input gear set coupling the drive shafts to the hub gear set.

* * * * *